United States Patent
Lamie et al.

(10) Patent No.: US 9,625,324 B1
(45) Date of Patent: Apr. 18, 2017

(54) THERMAL MONITORING AND ESTIMATING SYSTEM AND METHOD

(71) Applicants: John Lamie, Westport, CT (US); Anne Lamie, Stamford, CT (US)

(72) Inventors: John Lamie, Westport, CT (US); Anne Lamie, Stamford, CT (US)

(*) Notice: Subject to any disclaimer, the term of this patent is extended or adjusted under 35 U.S.C. 154(b) by 0 days.

(21) Appl. No.: 15/093,804

(22) Filed: Apr. 8, 2016

(51) Int. Cl.
  *G08B 25/10* (2006.01)
  *G01K 1/02* (2006.01)
  *G08B 21/18* (2006.01)

(52) U.S. Cl.
  CPC ........... *G01K 1/024* (2013.01); *G08B 21/182* (2013.01)

(58) Field of Classification Search
  None
  See application file for complete search history.

(56) References Cited

U.S. PATENT DOCUMENTS

| | | | |
|---|---|---|---|
| 2003/0169162 A1* | 9/2003 | Hyman | B60H 1/00978 340/438 |
| 2015/0041113 A1* | 2/2015 | Enke | B60H 1/00392 165/202 |
| 2016/0200168 A1* | 7/2016 | Boyer | H04R 19/04 701/45 |
| 2016/0203703 A1* | 7/2016 | Graeve | G08B 25/10 455/404.1 |

* cited by examiner

*Primary Examiner* — Brent Swarthout
(74) *Attorney, Agent, or Firm* — W.R. Samuels Law PLLC; John Lawrence (57) ABSTRACT

A thermal-tag device including a temperature sensor capable of continuously measuring the temperature in a closed space and of generating corresponding real time temperature data and a low-power communication module capable of wireless communication with a plurality of remote smartphone type devices, a plurality of remote smartphone type devices wirelessly coupled to the thermal tag implementing a temperature monitoring application, the temperature monitoring application continuously processing the received real-time temperature data and displaying real-time temperature information while the smartphone device is wirelessly coupled to the thermal-tag, and the temperature monitoring application continuously deriving and displaying estimated temperature data while the smartphone device is not wirelessly coupled to the thermal-tag device.

16 Claims, 7 Drawing Sheets

|  | Vehicle Attribute | Time Adjustment |
|---|---|---|
| Color | | |
| | Beige/Neutral | 0 |
| | Light | 2 |
| | White | 2 |
| | Silver | |
| | Dark | -2 |
| | Blue | -3 |
| | Black | -3 |
| Body Style | | |
| | Compact | -2 |
| | Economy | -2 |
| | Mid-Sized | 0 |
| | Wagon | 2 |
| | Mini Van | 3 |
| | SUV | 3 |
| | Light Truck | -2 |
| Window Treatment | | |
| | Dark Tint | -1 |
| | Tint | 2 |
| | None | 0 |
| | Reflective | 3 |

FIG. 8

| Breed Type | Time Value |
|---|---|
| Airedale Terrier | 2 |
| American Fox Hound | 2 |
| American Water Spaniel | 2 |
| Australian Cattle Dog | 2 |
| Belgian Malines | 2 |
| Belgian Sheepdog | 2 |
| Border Collie | 2 |
| Brittany Spaniel | 2 |
| Chesapeake Bay Retriever | 2 |
| Chihuahua | 2 |
| Chinese Crested Dog | 2 |
| German Pinscher | 2 |
| German Short Haired Pointer | 2 |
| Golden Retriever | 2 |
| Great Dane | 2 |
| Italian Greyhound | 2 |
| Labrador Retriever | 2 |
| Manchester Terrier | 2 |
| All brachycephic dogs (short, broad head) | -2 |
| Dogs over 7 years old | -3 |
| Overweight dogs | -3 |
| Puppies under 6 months | -3 |
| Small Dogs over 14 | -3 |
| Boston Terriers | -2 |
| Boxers | -2 |
| Bulldogs | -3 |
| French Bulldogs | -2 |
| Lhasa Apso | -2 |
| Pekingese | -2 |
| Pugs | -2 |
| Sharpe | -2 |
| Not specified    0 | 0 |
| Mixed, unknown | 0 |

FIG. 9

THERMAL MONITORING AND ESTIMATING SYSTEM AND METHOD

FIELD OF THE INVENTION

This disclosure relates generally to a system and method for monitoring and estimating the temperature in a closed space defined within an automobile.

BACKGROUND

Owners may often need to leave their dogs unattended in their automobile while they perform activities where dogs are not allowed such as inside malls, stores and other locations. However, the closed space within an automobile may heat up rapidly on a hot and sunny day. Depending on the conditions, the closed space within the automobile may reach 120 degrees Fahrenheit in a matter of minutes. Opening windows a small amount such that the dog may not escape will have very little effect on the rise of temperature within the closed space of that automobile.

Moreover, canines are generally not particularly well suited to high temperature environments. Unlike humans, who are able to use their entire bodies to disperse heat, dogs are only able to use their tongues and paws to disperse heat which represents less than 10% of their bodies surface area. As a result, dogs are generally intolerant to heat and can reach hyperthermia within minutes with serious injury or death quickly following.

A solution that allows dogs to safely accompany their owners in an automobile while also allowing owners to visit safely facilities in which dogs are not allowed is needed and addressed by the present invention.

PRIOR ART DOCUMENTS

Non-Patent Documents

Non-Patent Document 1: Andrew Grundstein, John Dowd, and Vernon Meentemeyer, 2010: Quantifying the heat-related hazard for children in motor vehicles. *Bull. Amer. Meteor. Soc.*, 91, 1183-1191. http://dx.doi.org/10.1175/2010BAMS2912.1.

Non-Patent Document 2: Russel Manning, and John Ewing, 2009: Temperature in Car Survey. http://www.racq.com.au/cars-and-driving/safety-on-the-road/driving-with-children/dangers-of-leaving-children-in-cars.

BRIEF SUMMARY

As a solution to the above described problems and needs, the present invention discloses an exemplary embodiment of a thermal monitoring and estimating system, comprising a thermal-tag device including a temperature sensor capable of continuously measuring the temperature in a closed space defined within an automobile and of generating corresponding real time temperature data, a low-power communication module capable of wireless communication with a plurality of remote smartphone type devices and a low power battery module capable of supplying power to the temperature sensor and the low-power communication module, the plurality of remote smartphone type devices each wirelessly coupled to the thermal-tag when in range of the low-power communication module so as to receive the real-time temperature data transmitted by the low-power communications module, the plurality of remote smartphone type devices each including a central processing unit capable of implementing a temperature monitoring application, the temperature monitoring application continuously processing the received real-time temperature data and displaying real-time temperature information while the smartphone device is wirelessly coupled to the thermal-tag, the temperature monitoring application continuously deriving and displaying estimated temperature data while the smartphone device is not wirelessly coupled to the thermal-tag device, the temperature monitoring application using the last real-time temperature data received from the low-power communication module as an initial temperature value for derived estimated temperature data, and the temperature monitoring application automatically and seamlessly switching between displaying real-time temperature information when the smartphone device is wirelessly coupled to the thermal-tag and displaying derived estimated temperature information when not wirelessly coupled to the thermal-tag.

The exemplary embodiment of a thermal monitoring and estimating system, wherein the thermal-tag is worn on an animal collar or other kinds of pet harnesses.

The exemplary embodiment of a thermal monitoring and estimating system, wherein the thermal-tag is wirelessly coupled to the remote smartphone device via Bluetooth.

The exemplary embodiment of a thermal monitoring and estimating system, wherein the temperature monitoring application provides for the selection of an automobile type that defines a cubic displacement amount in the closed space defined within the automobile.

The exemplary embodiment of a thermal monitoring and estimating system, wherein the temperature monitoring application further provides for inputting the color of the automobile.

The exemplary embodiment of a thermal monitoring and estimating system, wherein the temperature monitoring application further provides for inputting the presence or absence of tinted windows.

The exemplary embodiment of a thermal monitoring and estimating system, wherein the temperature monitoring application further provides for inputting the presence or absence of reflective windows.

The exemplary embodiment of a thermal monitoring and estimating system, wherein the temperature monitoring application determines the current outside temperature using the communication capabilities on the smartphone type device.

The exemplary embodiment of a thermal monitoring and estimating system, wherein the temperature monitoring application processes and displays real-time temperature information and estimated temperature information in either Fahrenheit and Centigrade temperature scales.

The exemplary embodiment of a thermal monitoring and estimating system, wherein the smartphone type device receives battery status data from the thermal tag via the low-power communication module and the temperature monitoring application processes and displays the received battery status data.

The exemplary embodiment of a thermal monitoring and estimating system, wherein the temperature monitoring application displays temperature alarms at pre-defined temperature values.

The exemplary embodiment of a thermal monitoring and estimating system, wherein the temperature monitoring application derives estimated temperatures from a temperature change curve, the temperature change curve interpolated from a table of empirical data on temperature changes inside an automobile over time.

The exemplary embodiment of a thermal monitoring and estimating system, wherein the temperature monitoring application selects a temperature change curve according to the current ambient outside temperature at the location of the smartphone type device.

The exemplary embodiment of a thermal monitoring and estimating system, wherein the temperature monitoring application locates the last received real-time temperature data from the thermal tag on the temperature change curve and then derives estimated temperatures upward of the located last received real-time temperature value as a function of time.

The exemplary embodiment of a thermal monitoring and estimating system, wherein the temperature monitoring application modifies the initial estimated temperature derived from the temperature change curve according to characteristics of the automobile.

The exemplary embodiment of a thermal monitoring and estimating system, wherein the temperature monitoring application modifies the initial estimated temperature derived from the temperature change curve according to the breed of the dog located in the closed space within in the automobile.

BRIEF DESCRIPTION OF THE DRAWINGS

This disclosure is further described in the detailed description that follows, with reference to the drawings, in which.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale as some features may be exaggerated or minimized to show details of particular components. Therefore the structural and functional details disclosed herein are not to be interpreted as limiting, but merely as a representative basis for teaching one skilled in the art to employ the present invention in various forms.

Figure 1:
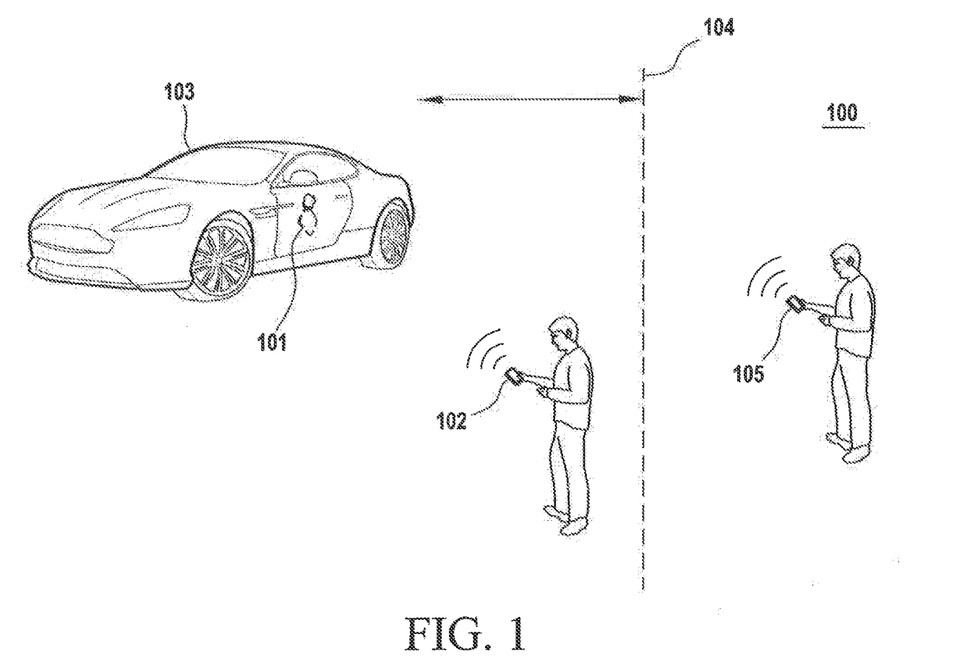
FIG. 1 is a diagram of a thermal monitoring and estimating system according to an exemplary embodiment of the present invention.

In FIG. 1, the thermal monitoring and estimating system according to an exemplary embodiment of the present invention is shown. As shown in FIG. 1, the thermal monitoring and estimating system 100 includes a thermal tag 101 located within an automobile 103 capable of wireless communication with a plurality of smartphone type devices 102, 105. The thermal tag 101 is capable of continuously sampling the temperature of the closed space within the automobile 103 and wirelessly transmitting sampled temperature data to the smartphone type devices 102, 105. Smartphone type devices 102 that are within wireless range 104 and able to wirelessly couple to a thermal tag 101 are then able to register one or more thermal tags 102 within range on that smartphone type device 102. Smartphone devices 102 are capable of wirelessly receiving a continuous stream of sampled temperature data transmitted from registered thermal tag 101 within range and then display such real-time temperature data samples on the display of the smartphone type device 102.

A temperature monitoring application running on the smartphone type device 102 processes received sampled temperature data and displays this real-time temperature data on the smartphone type device 102 as the current temperature of the closed space within the automobile 103. The temperature monitoring application continuously updates the displayed temperature on the smartphone type devices 102 using the real-time sampled temperature data received from the registered thermal tag 101 while still within wireless range of the registered thermal tag 101. Once the smartphone type device 105 moves out of wireless range 104 and is no longer wirelessly coupled to the registered thermal tag 101, the temperature monitoring application automatically and seamlessly switches from displaying real-time temperature data to displaying a temperature estimate. The temperature estimate is based on an interpolated temperature estimate curve for the current outside ambient temperature as a function of time, the time being the amount of time that has passed since the last real-time temperature data was received.

The temperature monitoring application will automatically switch between displaying real-time temperature data when it is within wireless range of a registered thermal tag 101 and displaying a temperature estimate when the smartphone type device 105 moves out of wireless range and so is no longer coupled to the registered thermal tag 101. The estimated temperature derived from the interpolated temperature estimate curve is automatically updated with real-time sampled temperature data whenever a smartphone type device 102, 105 moves back into and then out again of wireless range of a registered thermal tag 101.

The temperature of the closed space within the automobile 103 may be displayed in multiple graphical or textual forms including a temperature pictorial or plain text. As such, all forms of display know to one of reasonable skill in the art being within the scope or the present invention.

The temperature monitoring application also provides for visual and audible alarms on a smartphone type device 102, 105 at pre-defined temperature thresholds. The amplitude and frequency characteristics of both the visual and audible alarms may be modified based on the current temperature threshold or other relevant characteristics. The audible alarm may be any electronically generated or a custom recorded sound including a dog bark.

The temperature monitoring application running on each of the coupled smartphone type devices displays these temperature values in any standard format, including as Fahrenheit or Centigrade values.

Figure 2:
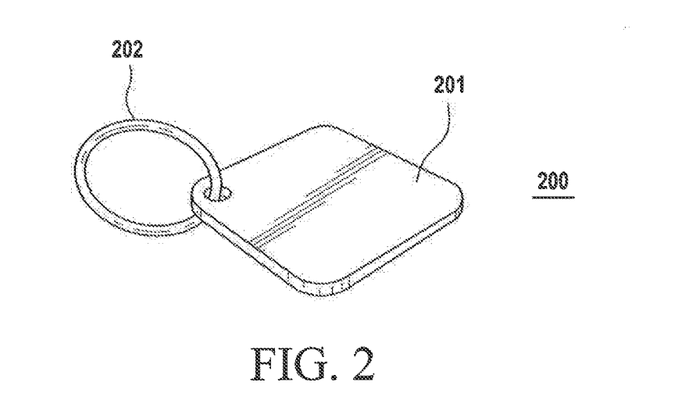
FIG. 2 is a rendering of a thermal tag footprint according to an exemplary embodiment of the present invention.

In FIG. 2, a rendering of a thermal tag footprint according to an exemplary embodiment of the present inventor is depicted. As shown in FIG. 2, the thermal tag 200 footprint is comprised of a container portion 201 with an attached keyring 202. The container portion 201 is purposely small and lightweight to accommodate being attached to and worn on a dog collar or other kinds of pet harnesses, carried in a pocket or bag, or placed at a strategic location within the automobile 103. While the exemplary embodiment discloses a closed space within an automobile, one of reasonable skill in the art will surely understand that placing a thermal tag in a closed space defined in other types of locations are still within the scope of the present invention.

Figure 3:
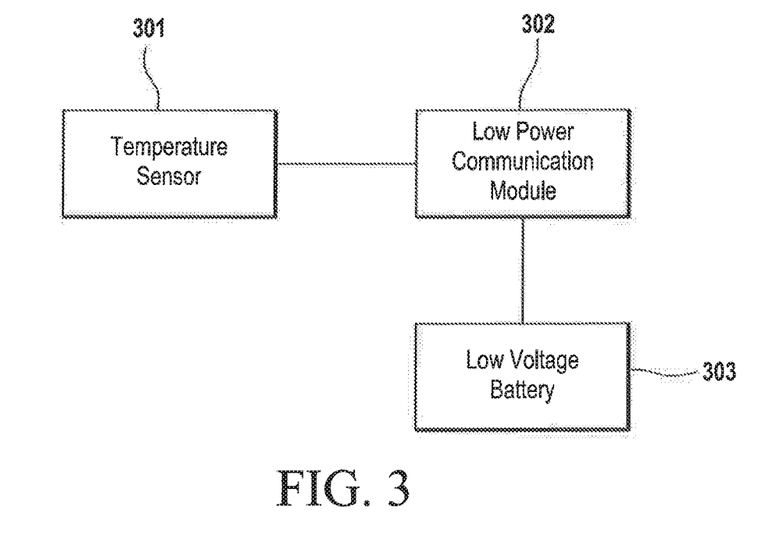
FIG. 3 is a schematic of the components of a thermal tag according to an exemplary embodiment of the present invention.

In FIG. 3, a schematic of the components of a thermal tag according to an exemplary embodiment of the present invention is shown. As shown in FIG. 3, the components of the thermal tag 300 include at least a temperature sensor 301, a low energy communication module 302, and a low power battery module 303.

The low power communication module 302 is a low energy wireless interface. In an exemplary embodiment, this module may be a Bluetooth low energy module with a wireless range of approximately 300 ft in a straight line. The low energy communication module 302 may further include an onboard microcontroller with a variety of peripherals including an analog to digital converter. The low energy communication module 302 wirelessly couples with a smartphone type device that is within its energy power wireless range. Moreover, each low energy communication module 302 is assigned a unique identifier that is used to register the thermal tag on one or more smartphone type devices. This allows for a single smartphone type device to wirelessly couple with multiple registered thermal tags 300. Of course, a low power communication module having different or additional electronic characteristics including different available ranges are still within the scope of the present invention.

The temperature sensor 301 provides temperature readings directly to the low energy communication module 302. The temperature readings may be in the form of a steam of sampled temperature data that is routed directly to a digital data input on the low energy communication module 302. Alternatively, the temperature sensor 301 may be an analog sensor whose output is routed directly to the analog to digital sensor on the low energy communication module 302. The analog to digital converted samples the analog temperature input at regular intervals and converts these samples into a digital format. The low energy communication module 302 formats and transmits the sampled temperature data to wirelessly coupled smartphone type devices.

The low power battery module 303 provides power both the low energy communication module 302 and the temperature sensor 301, if needed. In an exemplary embodiment, low power battery module 303 may be designed to hold a 3 volt coin type battery.

Figure 4:
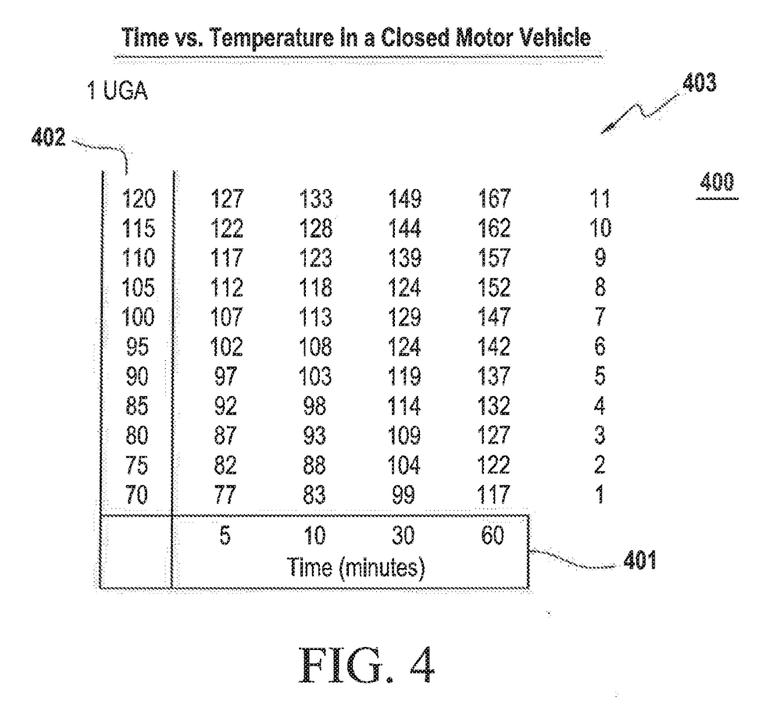
FIG. 4 is a representation of a table of vehicle temperature change as used in an exemplary embodiment of the present invention.

In FIG. 4, a representation of a table of vehicle temperature change as used in an exemplary embodiment of the present invention is shown. This table of vehicle temperature change provides empirical information on temperature changes over time for different starting temperature values. As discussed in Non-Patent Document 1, this table was developed by measuring the air temperature for fifty eight days in a metallic gray Honda with gray cloth seats parked in an open, paved parking lot with direct exposure to sunlight. Temperature sensors positioned within the car were used to gather the temperature data. The table was constructed using fourteen clear days representing the most severe possible conditions.

As shown in FIG. 4, the vehicle temperature change table 400 has a time x-axis 401 in minutes and an outside ambient temperature y-axis 402 in Fahrenheit. The table body 403 shows the temperature change within a car over time as a worst case scenario based on each outside ambient temperature. The temperature monitoring application implemented on a smartphone type device uses the data in this table 400 to estimate the temperature of the closed space within an automobile containing a thermal tag registered on that smartphone type device. Specifically, a worst case temperature change curve is interpolated for each outside ambient temperature based on the data in the vehicle temperature change table 400. Each of these curves will then be used to estimate the temperature in the closed space within the car when the smartphone type device moves out of wireless range of the registered thermal tag.

Figure 5:
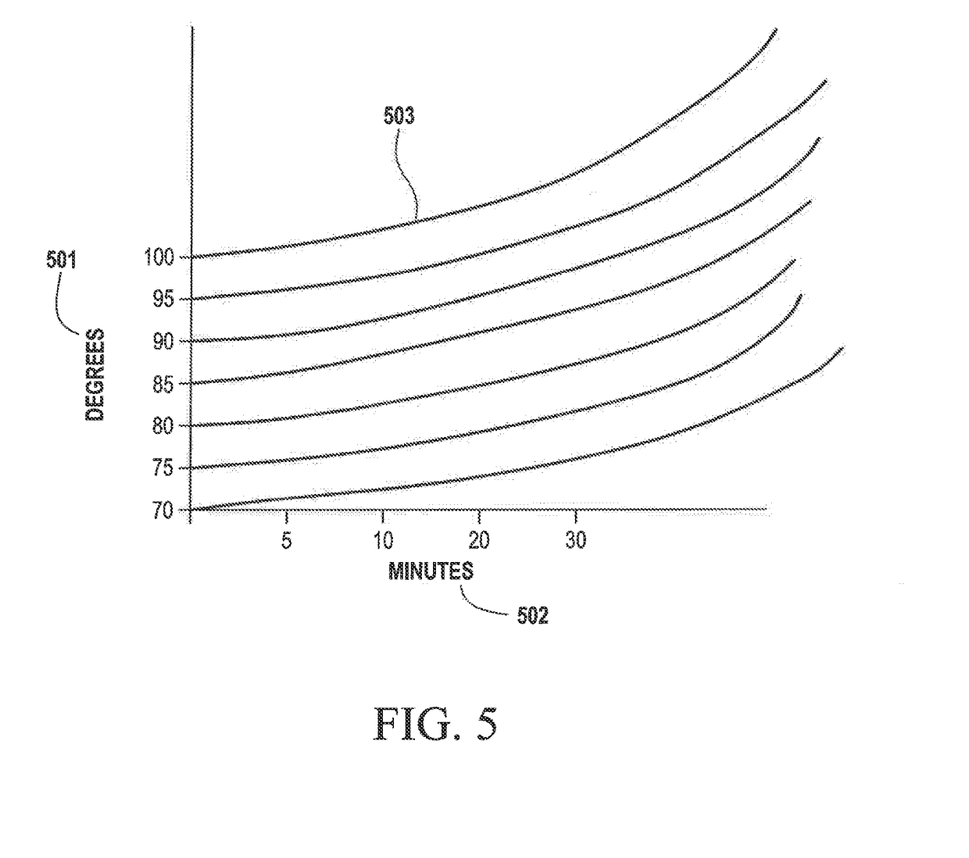
FIG. 5 is a representation of temperature change curves interpolated from the table of vehicle temperature change as used in an exemplary embodiment of the present invention.

In FIG. 5, a representation of temperature change curves interpolated from the temperature change table as used in an exemplary embodiment of the present invention is shown. As shown in FIG. 5, a temperature change curve 503 is interpolated for each outside ambient temperature 501 over time 502 using the empirical data provided within the vehicle temperature change table for that particular outside ambient temperature. The outside ambient temperatures 501 are shown in degrees Fahrenheit but could also be in degrees Celsius. Similarly, while the time scale 502 is shown in minutes, other appropriate scales may be used.

As will be described in greater detail below, once a user initiates the monitoring of a registered thermal tag, the temperature monitoring application selects a temperature change curve based on the determined outside ambient temperature at the current location of the registered thermal tag. The temperature monitoring application displays the real time temperature data while the smartphone type device is still within range of and wirelessly coupled to the registered tag thermal tag. Once the smartphone type device moves out of range of and is no longer wirelessly coupled to the registered thermal tag, the temperature monitoring application immediately locates the last received real-time temperature value on the selected temperature change curve and automatically starts displaying estimated temperature data according to the selected temperature change curve. Specifically, the temperature monitoring application displays estimated temperature values upward of the last received real-time temperature value according to the temperature change curve as a function of the time passed since receiving the last real-time temperature data. This continues until either the monitoring process ends or the smartphone type device moves back in range of the registered thermal tag. If the smartphone type device actually moves back into wireless range of the registered thermal tag and again starts to receive real-time temperature data, the temperature monitoring application automatically switches back to displaying real-time temperature data from the registered thermal tag. If the smartphone type device again moves out of range, the temperature monitoring application again locates the last real-time temperature value on the selected temperature change curve and automatically displays upward temperature estimate values from the temperature change curve as a function of the time passed since last receiving real-time temperature data from the registered thermal tag.

Figure 6:
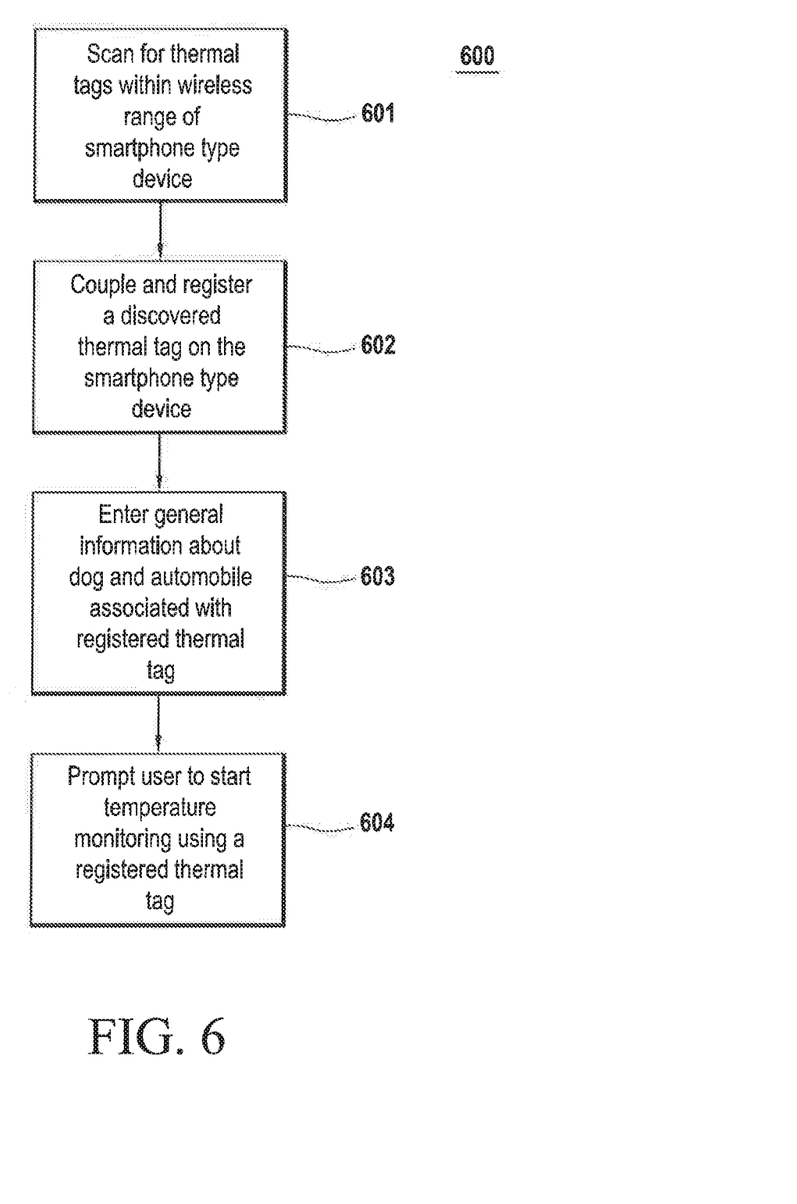
FIG. 6 is a flow chart depicting the registration of a thermal tag on a smartphone type device according to an exemplary embodiment of the present invention.

In FIG. 6, a flow chart depicting the registration of a thermal tag on a smartphone type device according to an exemplary embodiment of the present invention is shown. As shown in FIG. 6, the process of registering a thermal tag 600 begins with a customer's smartphone type device in step 601 scanning for thermal tags that are within wireless range.

Once the thermal tags within wireless range have been discovered by the smartphone type device, the customer in step 602 selects one or more of the discovered thermal tags to register on the smartphone type device. The smartphone type device will monitor and display temperature data from each of the thermal tags registered on that smartphone type device. Each thermal tag is registered on a smartphone type device using a unique identified that is assigned to each thermal tag, thereby allowing the smartphone type device to register and monitor multiple thermal tags.

The temperature monitoring application implemented on the smartphone type device then in step 603 prompts the customer to enter general information about the dog and the automobile associated with the registered thermal tag.

At this point, the thermal tag is registered on the customer's smartphone type device and the smartphone type device is ready to receive real-time temperature data from that registered thermal tag. The temperature monitoring application in step 605 then prompts the user to press a designated start button on the smartphone type device to actually begin monitoring temperature using a registered thermal tag. Once the start button has been selected, the temperature monitoring application is ready to automatically switch between displaying real-time temperature data received from a registered thermal tag and displaying estimated temperature data derived from a selected temperature change curve. The display including a visual designation between real-time temperature data and estimated temperature data.

Figure 7:
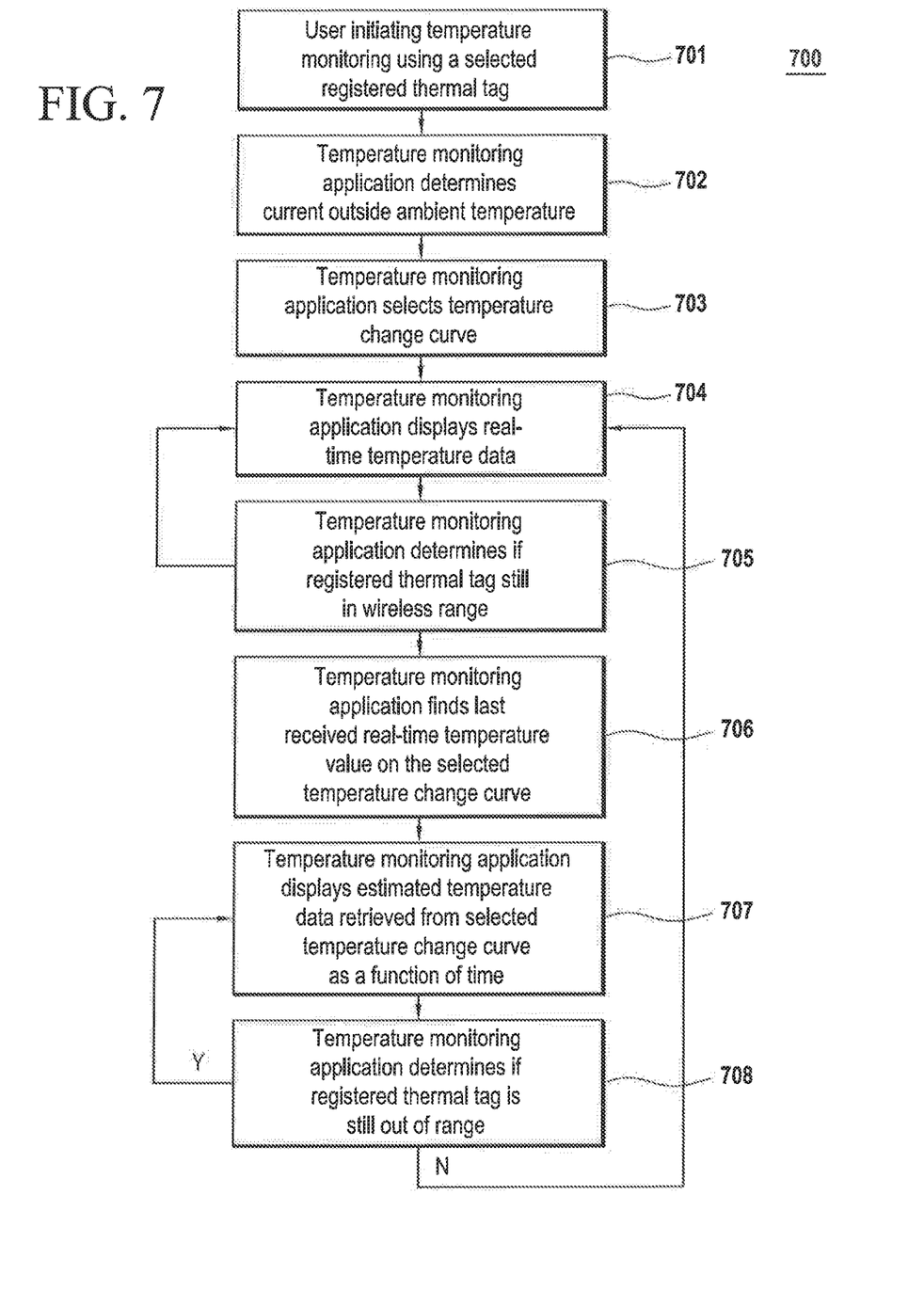
FIG. 7 is a flow chart depicting temperature monitoring from a registered thermal tag on a smartphone type device according to an exemplary embodiment of the present invention.

In FIG. 7, a flow chart depicting temperature monitoring from a registered thermal tag on a smartphone type device according to an exemplary embodiment of the present invention is shown. As shown in FIG. 7, the monitoring process begins with the user in step 701 actually initiating the monitoring of temperature using a selected registered thermal tag.

Once the user has initiated temperature monitoring using a selected registered thermal tag, the temperature monitoring application in step 702 determines the current outside ambient temperature. The temperature monitoring application may use any means available to the smartphone type device to determine the current outside ambient temperature including using a smartphone type device's global positioning service to determine its current location and then accessing the Internet to determine the current outside ambient temperature at that location. Of course, using the smartphone type device to determine the current location of the thermal tag presumes that the smartphone type device is within wireless range of the thermal tag when its current location is determined.

The determined current outside ambient temperature is then used in step 703 to select a temperature change curve that has been interpolated from the vehicle temperature change table. The selected interpolated temperature change curve will be used to estimate the temperature of the closed space within the automobile when the smartphone type device moves out of wireless range of the selected registered thermal tag.

The temperature monitoring application in step 704 begins displaying on the smartphone type device the real-time temperature data received from the registered thermal tag. As discussed above, the real-time temperature data may be displayed in any format or standard known to one of reasonable skill in the art including an indicator confirming that real-time temperature data is currently being displayed rather than estimated temperature data.

While displaying real-time temperature data, the temperature monitoring application in step 705 is also continuously determining whether or not the registered thermal tag is still within wireless range. If it is determined that the smartphone type device is still within wireless range of the registered thermal tag, then the temperature monitoring application reverts back to step 704 where it continues to display real-time temperature data received from the registered thermal tag.

Alternatively, if it is determined that the smartphone type device has moved out of wireless range of the registered thermal tag, then the temperature monitoring application continues to step 706 where it immediately accesses the selected temperature change curve and locates on that temperature change curve the last real-time temperature value received from the registered thermal.

The temperature monitoring application then in step 707 immediately switches from displaying real-time temperature data to displaying estimated temperature data derived from the selected temperature change curve. The estimated temperature values derived from the curve begin from that point located on the temperature change curve correlating to the last receive real-time temperature value. The estimated temperatures values derived from the temperature change curve are incremented along the curve as a function of time, the time function being the time passed since the last received real-time temperature data.

While displaying estimated temperature data, the temperature monitoring application in step 708 also continuously determines whether or not the registered thermal tag is still outside wireless range. If it is determined that the smartphone type device is still outside wireless range, then the temperature monitoring application continues back to step 707 were it continues to display estimated temperature data derived from the temperature change curve as a function of time.

Alternatively, if it is determined that the smartphone type device has moved back within wireless range, then the temperature monitoring application jumps back to step 704 where it displays on the smartphone type device real-time temperature data received from the registered thermal tag.

In another embodiment, the smartphone type device may wirelessly link with a transmitter/receiver incorporated within an automobile thereby allowing for the exchange of data between the smartphone type device and the on-board systems within the automobile. As a result, temperature monitoring application functions may be implemented and displayed on both the remote smartphone type device as well as on the in-board dashboard of the automobile. As a an example, the registration of a thermal tag, the selection of a registered thermal tag and the starting of the temperature monitoring process all may be implemented and synced on both the smartphone type device and the in-car dashboard screen. Real-time and estimated temperature data may be displayed simultaneously on both the smartphone type device and the in-car dashboard screen of the automobile. Moreover, the in-car dashboard screen may be configured to mirror the display of the temperature monitoring application on the smartphone type device, allowing for the replication of all input and output function on both the in-car dashboard display and the smartphone type device display.

In another embodiment of the present invention, the physical characteristics of the automobile may be used to modify the temperature estimates derived from a selected temperature change curve when a smartphone type of device is out of range of a registered thermal tag. Specifically, the temperature monitoring application running on a smartphone device may prompt for and accept inputs from a user that may then be used to customize the estimated temperature of a closed space within an automobile. These inputs may include the body type and color of the automobile as well as whether or not the automobile has tinted or reflective windows. The automobile body type relates to the cubic feet of the closed space defined within the automobile. The automobile color affects to the amount of heat absorption experienced by the automobile. Tinted or reflective windows will affect the amount of heat transfer from outside the automobile to the closed space defined within the automobile.

Figure 8:
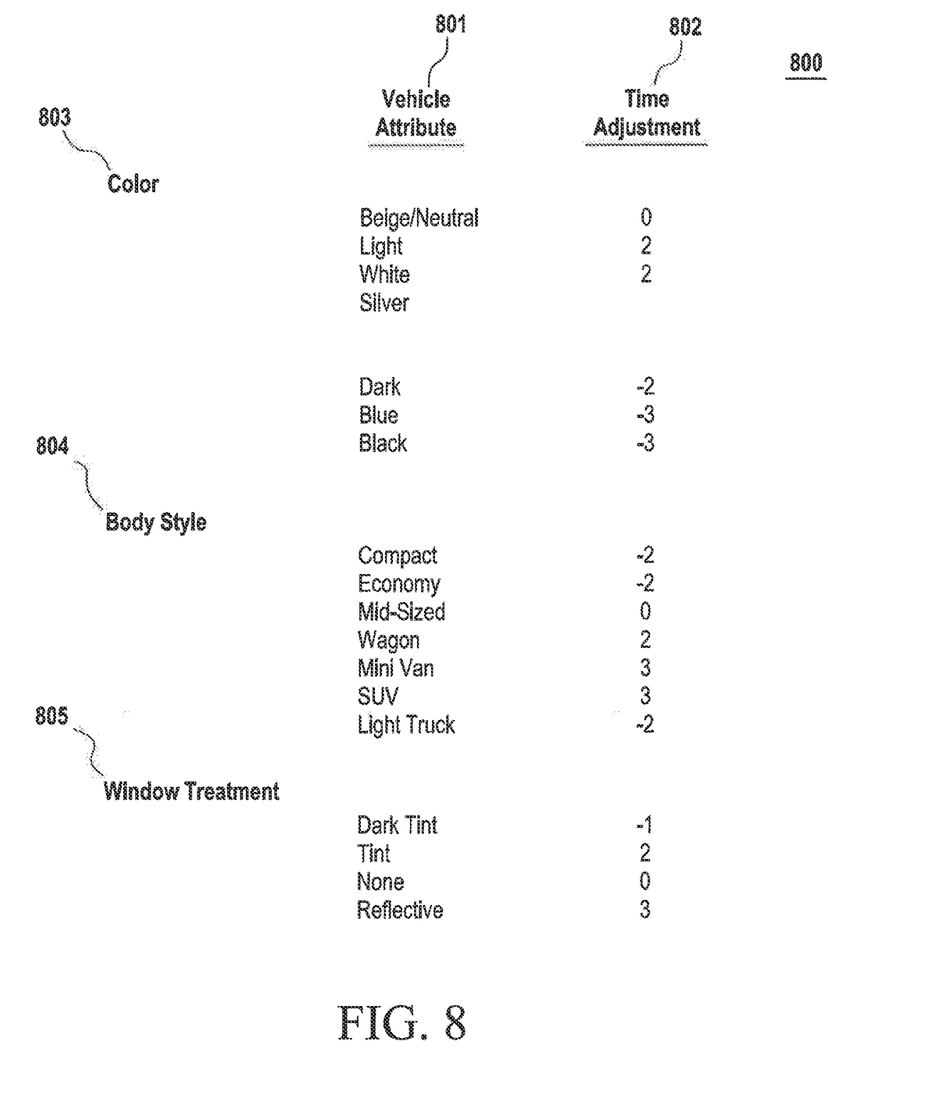
FIG. 8 is a table showing the relationships between the physical characteristics of an automobile and corresponding time changes used in temperature estimations according to an exemplary embodiment of the present invention.

In FIG. 8, a table showing relationships between the physical characteristics of an automobile and corresponding time changes used in temperature estimations according to an exemplary embodiment of the present invention is shown. As shown in FIG. 8, the table 800 includes a listing of vehicle attributes 801 and their corresponding time adjustment factor 802. The vehicle attributes 801 are grouped into color 803, body type 804, and window treatment 805.

The color grouping 803 defines standard industry colors or shades, namely light colors (beige, neutral, light and white) and dark colors (blue and black). The light colors having a positive time adjustment factors 802 since light colors reflect more heat energy as compared to darker colors. The dark colors having negative time adjustment factors 802 because dark colors absorb more heat energy as compared to lighter colors.

The body style grouping 804 includes compact, economy, midsized, wagon, minivan, sports utility vehicle (SUV) and light pick-up truck. The compact and economy body styles having negative time factor adjustments 802 because the closed space defined within these body styles is less than that of a midsized car. The wagon and minivan body styles having positive time factor adjustments 802 because the closed space defined within these body styles is greater than a midsized car.

The window treatment grouping 805 includes tinted and reflective. The tinted and reflective window treatment having a positive time adjustment factor 802 because they tinted and reflective windows absorb less heat energy than a clear window.

A cumulative time adjustment factor is used to modify the time function used with a temperature change curve when deriving temperature estimate values using a selected temperature change curve. A positive time adjustment factor delays the time based increase in derived temperature estimate values while a negative time adjustment value speeds up the time based increase in derived temperature estimate values.

A cumulative time factor adjustment is calculated for a specific automobile by simply adding together all the individual time factor adjustments applicable to that specific automobile. As an example, a blue sports utility vehicle with tinted windows would have a cumulative time factor adjustment of a positive two minutes. This translates into delaying the time based increase in derived temperature estimate values by two minutes on the selected temperature increase curve.

The cumulative time adjustment factor may be applied whenever a smartphone type device moves out of range of a registered thermal tag. As described above in FIG. 7, when the temperature monitoring application determines that it is no longer within range of a registered thermal tag, it finds the last received real-time temperature value on the selected temperature change curve and derives estimated temperature values upward of that located value as a function of the time passed since the last real-time temperature data was received. The application of a cumulative time adjustment factor modifies the time function by either adding to or subtracting from the time value associated with the located last received real-time temperature value.

Following the above example of a blue sports utility vehicle with tinted windows, when the smartphone type device moves out of range of the registered thermal tag located within this automobile, the temperature monitoring application locates the last real-time temperature value received from that thermal tag on the selected temperature change curve. If the last received real-time temperature value was eighty degrees Fahrenheit, then the temperature monitoring application would determine that the corresponding time value on the selected temperature change curve is five (5) minutes. The application of the positive two (2) minute cumulative time adjustment factor moves the current time value back down to the three (3) minute value on the selected temperature curve. The temperature monitoring application now derives estimated temperature values starting with the temperature value corresponding with the new three (3) minute time value rather than the original five (5) minute value.

The application of cumulative time adjustment factor may be defined such that it is applied only for certain temperature or time ranges or at specific smartphone type device transitions between being within and being outside of wireless range of a registered thermal tag.

In another embodiment of the present invention, the breed type of a dog in an automobile may be used to modify the temperature estimates derived from a selected temperature change curve when a smartphone type of device is out of range of a registered thermal tag. The breed type may also be used to modify alarm settings on the smartphone type device to define which alarms should be triggered at which temperature. As with automobile information, the temperature monitoring application running on a smartphone device may prompt for and accept inputs from a user as to the breed type of a dog located in the closed space within an automobile.

Figure 9:
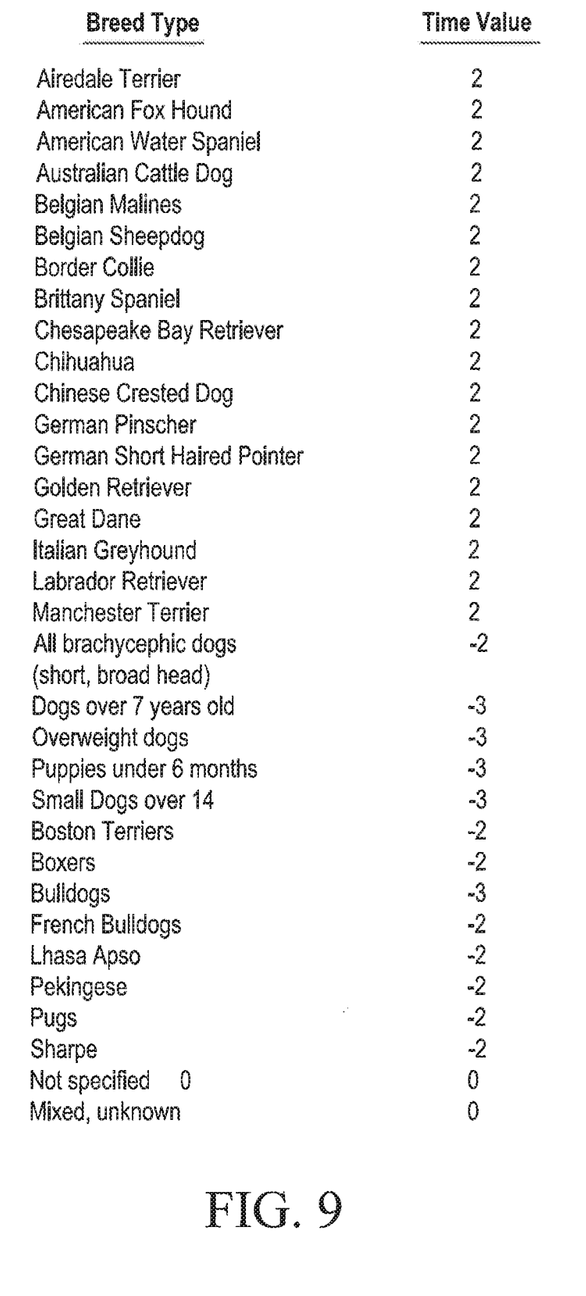
FIG. 9 is a table showing the relationships between the dog breed types and corresponding time changes used in temperature estimations and/or alarm settings according to an exemplary embodiment of the present invention.

In FIG. 9, a table showing the relationships between the dog breed types and corresponding time changes used in temperature estimations and/or alarm settings according to an exemplary embodiment of the present invention is shown. As shown in FIG. 9, the table 900 includes a breed type column 901 and a column of corresponding time adjustment factor values 902. As discussed above, a time adjustment factor value corresponding to specific breed type may be used to modify the time function used with a temperature change curve when deriving temperature estimate values using a selected temperature change curve. As also discussed above, a positive time adjustment factor delays the time based increase in derived temperature estimate values while a negative time adjustment value speeds up the time based increase in derived temperature estimate values.

A time adjustment factor value corresponding to a specific breed type may also be used to modify at what temperature (real-time or estimated) an alarm goes off on the smartphone type device. The time adjustment factor value corresponding to a specific breed type reflecting a specific breed's tolerance of increasing temperatures.

What is claimed is:

1. A thermal monitoring and estimating system, comprising:
- a thermal-tag device including a temperature sensor capable of continuously measuring the temperature in a closed space defined within an automobile and of generating corresponding real time temperature data, a low-power communication module capable of wireless communication with a plurality of remote smartphone type devices and a low power battery module capable of supplying power to the temperature sensor and the low-power communication module;
- the plurality of remote smartphone type devices each wirelessly coupled to the thermal-tag when in range of the low-power communication module so as to receive the real-time temperature data transmitted by the low-power communications module;
- the plurality of remote smartphone type devices each including a central processing unit capable of implementing a temperature monitoring application;
- the temperature monitoring application continuously processing the received real-time temperature data and displaying real-time temperature information while the smartphone device is wirelessly coupled to the thermal-tag;
- the temperature monitoring application continuously deriving and displaying estimated temperature data while the smartphone device is not wirelessly coupled to the thermal-tag device;
- the temperature monitoring application using the last real-time temperature data received from the low-power communication module as an initial temperature value for derived estimated temperature data; and
- the temperature monitoring application automatically and seamlessly switching between displaying real-time temperature information when the smartphone device is wirelessly coupled to the thermal-tag and displaying derived estimated temperature information when not wirelessly coupled to the thermal-tag.

2. The thermal monitoring and estimating system of claim 1, wherein the thermal-tag is worn on an animal collar or other kinds of pet harnesses.

3. The thermal monitoring and estimating system of claim 1, wherein the thermal-tag is wirelessly coupled to the remote smartphone device via Bluetooth.

4. The thermal monitoring and estimating system of claim 1, wherein the temperature monitoring application provides for the selection of an automobile type that defines a cubic displacement amount in the closed space defined within the automobile.

5. The thermal monitoring and estimating system of claim 4, wherein the temperature monitoring application further provides for inputting the color of the automobile.

6. The thermal monitoring and estimating system of claim 4, wherein the temperature monitoring application further provides for inputting the presence or absence of tinted windows.

7. The thermal monitoring and estimating system of claim 4, wherein the temperature monitoring application further provides for inputting the presence or absence of reflective windows.

8. The thermal monitoring and estimating system of claim 1, wherein the temperature monitoring application determines the current outside temperature using the communication capabilities on the smartphone type device.

9. The thermal monitoring and estimating system of claim 1, wherein the temperature monitoring application processes and displays real-time temperature information and estimated temperature information in either Fahrenheit and Centigrade temperature scales.

10. The thermal monitoring and estimating system of claim 1, wherein the smartphone type device receives battery status data from the thermal tag via the low-power communication module and the temperature monitoring application processes and displays the received battery status data.

11. The thermal monitoring and estimating system of claim 1, wherein the temperature monitoring application displays temperature alarms at pre-defined temperature values.

12. The thermal monitoring and estimating system of claim 1, wherein the temperature monitoring application derives estimated temperatures from a temperature change curve, the temperature change curve interpolated from a table of empirical data on temperature changes inside an automobile over time.

13. The thermal monitoring and estimating system of claim 12, wherein the temperature monitoring application selects a temperature change curve according to the current ambient outside temperature at the location of the smartphone type device.

14. The thermal monitoring and estimating system of claim 12, wherein the temperature monitoring application locates the last received real-time temperature data from the thermal tag on the temperature change curve and then derives estimated temperatures upward of the located last received real-time temperature value as a function of time.

15. The thermal monitoring and estimating system of claim 14, wherein the temperature monitoring application modifies the initial estimated temperature derived from the temperature change curve according to characteristics of the automobile.

16. The thermal monitoring and estimating system of claim 14, wherein the temperature monitoring application modifies the initial estimated temperature derived from the temperature change curve according to the breed of the dog located in the closed space within in the automobile.

* * * * *